May 21, 1963

H. A. BLENKLE 3,090,456

ELECTRICALLY POWERED WHEEL

Filed April 4, 1961

INVENTOR
HERBERT A. BLENKLE

BY *Darby & Darby*

ATTORNEYS

May 21, 1963 H. A. BLENKLE 3,090,456
ELECTRICALLY POWERED WHEEL

Filed April 4, 1961 4 Sheets-Sheet 4

INVENTOR
HERBERT A. BLENKLE

BY *Darby + Darby*

ATTORNEYS

United States Patent Office 3,090,456
Patented May 21, 1963

3,090,456
ELECTRICALLY POWERED WHEEL
Herbert A. Blenkle, Englewood, N.J., assignor to Fairchild Stratos Corporation, a corporation of Maryland
Filed Apr. 4, 1961, Ser. No. 100,744
10 Claims. (Cl. 180—10)

The present invention relates to an electrically powered wheel and more particularly to an electrical motor drive and hydraulic transmission mounted on the axle of a motor vehicle wheel.

While various mounting arrangements are known for providing at least a portion of a hydraulic transmission at each wheel, the present invention provides a novel independent wheel drive arrangement wherein the motive force as well as an infinitely variable, wide range hydraulic transmission are both mounted upon the wheel of a vehicle. While having general utility the drive of the present invention is particularly adapted for use in conjunction with the piston driven engine of an automotive vehicle actuating a suitable alternator generator. The generator drives an electric motor mounted on the wheel hub which motor in turn drives a hydraulic pump and a plurality of hydraulic motors constituting the variable transmission.

In the invention a hydraulic pump driven by the electric motor provides fluid under pressure to multiple hydraulic motors. The swash plates of all motors and the pump are variable by means of a cam ring to provide a wide torque ratio range. Since the constant speed electric motor does not know what is happening at the wheel it is possible to design the cam ring so that a constant load is placed on the electrical motor regardless of whether the available horsepower is delivered at the wheel in the form of a high torque with low r.p.m. or high r.p.m. with low torque.

It is therefore a primary object of the present invention to provide a novel wheel mounted drive.

Another object of the present invention is to provide a constant speed, constant torque electrical motor drive and transmission for a vehicle wheel.

Another object of the present invention is to provide a novel drive wheel for heavy duty vehicles.

Another object of the present invention is to provide a drive wheel wherein the drive motor and an infinitely variable hydraulic transmission are mounted on the wheel hub.

These and other objects and advantages of the invention will be more apparent upon reference to the following specification, claims and appended drawings wherein:

Figure 1:
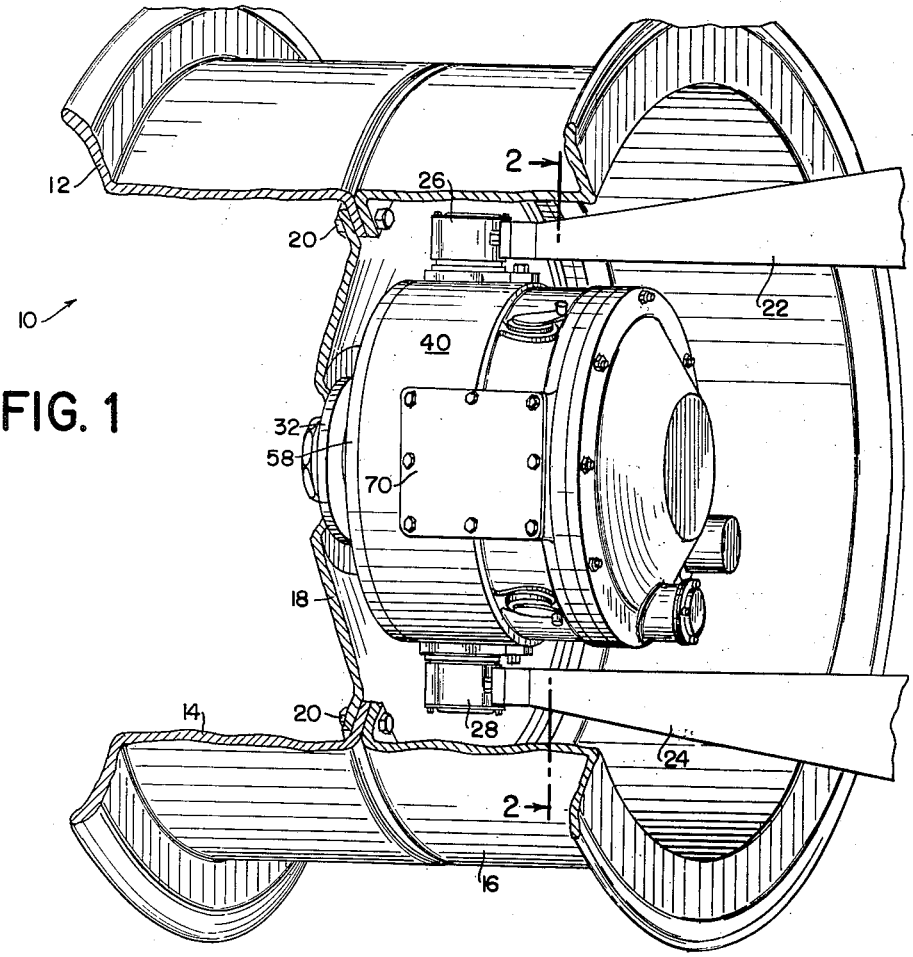
FIGURE 1 is a perspective view with portions of the rim broken away showing the novel hub mounted wheel drive of the present invention.

Referring to the drawings, the wheel of the present invention generally indicated at 10 comprises a rim 12 having right and left hand sections 14 and 16 secured to a wheel disc 18 by a plurality of circularly spaced bolts 20.

Wheel 10 is supported from a pair of vehicle frame members 22 and 24 by means of rotatable brackets or pivots 26 and 28.

Figure 3:
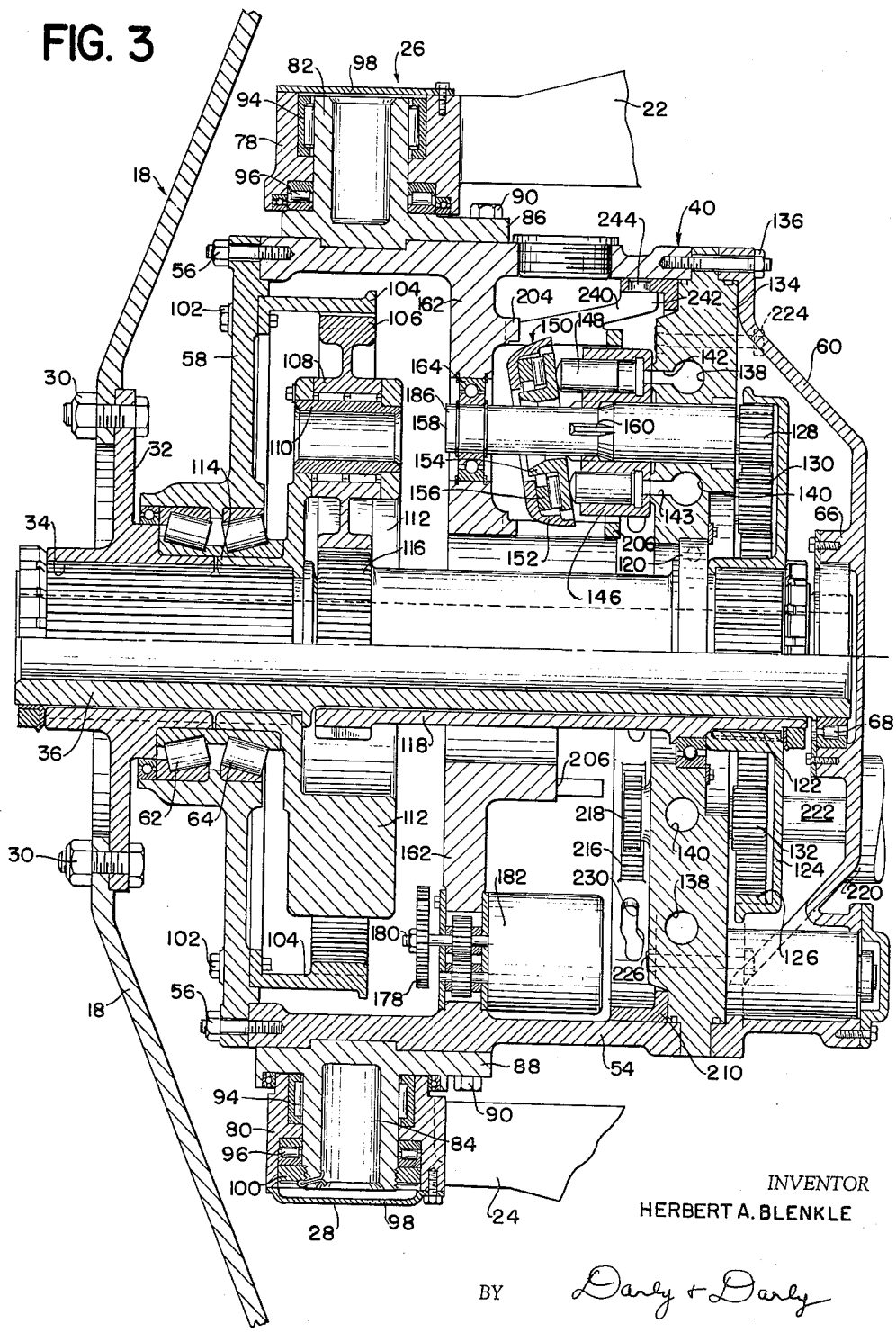
FIGURE 3 is a longitudinal cross section taken along line 3—3 of FIGURE 2.

Secured to disc 18 by circularly spaced bolts 30 is a hub 32 splined at 34 as best seen in FIGURE 3 to a rotatable hollow central shaft 36 forming the drive axle for the wheel. Rotation of the shaft 36 carries with it hub 32 and disc 18 to produce rotation of the rim 12 and a suitable tire (not shown) which may surround the rim.

Figure 2:
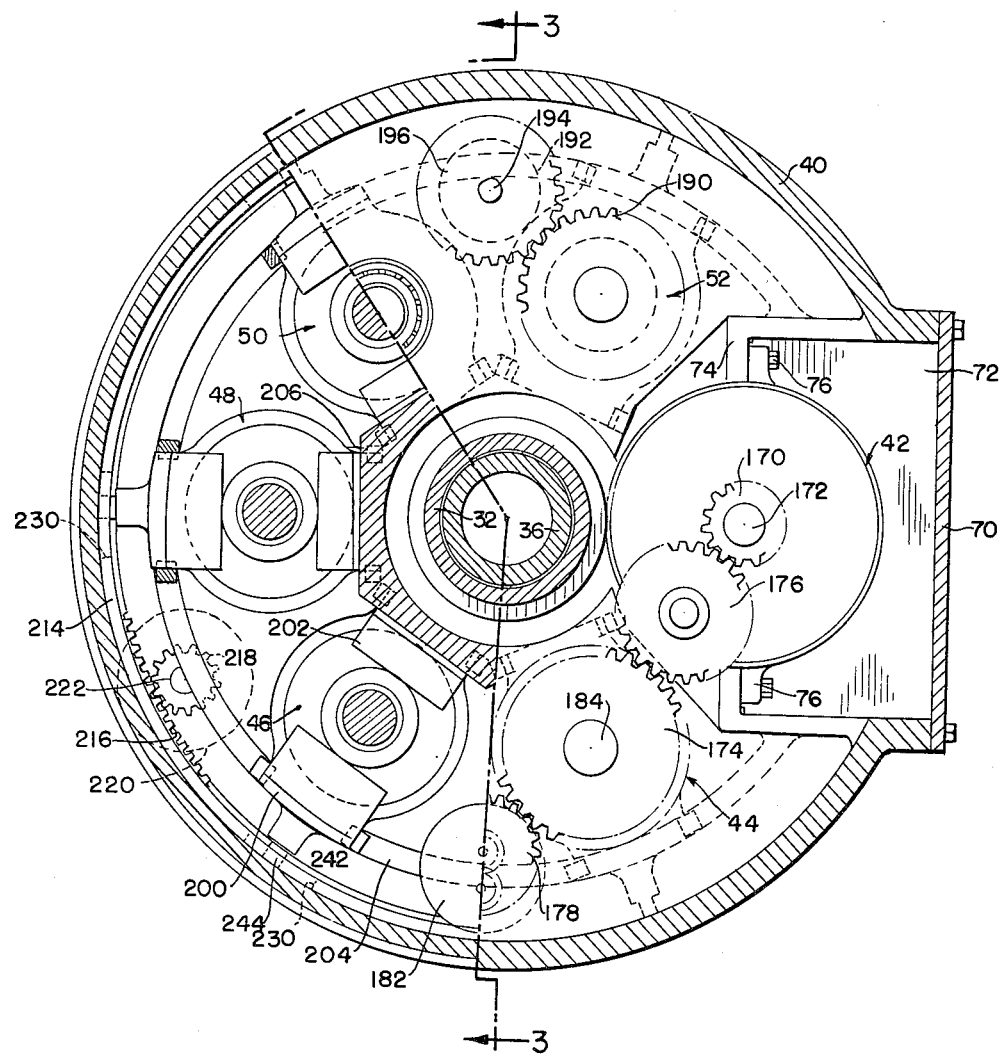
FIGURE 2 is a cross section of the wheel drive of FIGURE 1 taken approximately along the lines 2—2 of FIGURE 1.

Hub 32 is connected to the upper and lower frame members 22 and 24 through a combination electrical drive motor and transmission housing 40 which encloses an electrical motor 42 best seen in FIGURE 2, hydraulic pump 44, and four hydraulic motors 46, 48, 50 and 52 spaced clockwise about the central shaft or axle 36. Pump 44 and motors 46, 48, 50 and 52 are all of similar swash plate type construction and constitute an infinitely variable hydrostatic transmission between drive motor 42 and axle 36.

Housing 40 comprises an annulus 54 bolted as at 56 to a back plate 58 and a front plate 60. Back plate 58 is mounted by suitable heavy duty thrust bearings 62 and 64 on the rotating hub 32. Shaft 36 is rotatably received within boss 66 of front plate 60 by bearings 68. Access to electrical motor 42 is through a removable cover plate 70 as seen in FIGURES 1 and 2. The cover plate is secured to a portion of housing 40 having a reentrant well 72 terminating in a skeleton partition 74 to which the motor 42 is suitably bolted as indicated at 76.

Figure 5:
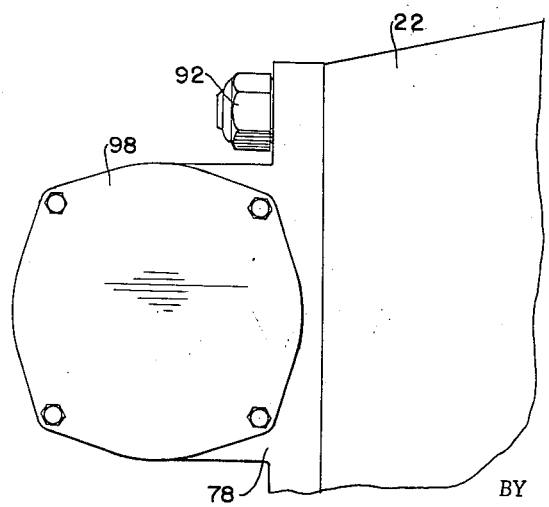
FIGURE 5 is a plan view of one of the wheel mounting brackets shown in FIGURE 1.

Arms 22 and 24 of the vehicle frame terminate in annular sockets 78 and 80 surrounding hollow spindles 82 and 84 formed integral with bearing plates 86 and 88 bolted to the upper and lower sides of annulus 54 by bolts 90. Sockets 78 and 80 are secured to the ends of frame members 22 and 24 by means of bolts 92 as seen in FIGURE 5 and are spaced from their respective bearing plates by bearings 94 and 96. These bearings permit relative movement between the sockets and the bearing plates so that the wheel is free to turn with respect to the frame members when the direction of vehicle travel is changed. Each of the bearing plates is closed off by a cover plate 98. Bearing 96 for the lower pivotal connection is supported by means of a threaded lock washer 100 received over the threaded end of bearing plate 84.

Secured to back plate 58 of the housing by means of bolts 102 as best seen in FIGURE 3 is an annular ring gear 104 having internal teeth mating at 106 with the teeth of a planetary gear 108 mounted on a stub axle 110 received in a planetary carrier 112. While only a single planetary gear is shown it is to be understood that a plurality of planetary gears are mounted on the carrier 112 and engage the ring gear 104 at spaced points about the carrier. Carrier 112 is splined to the axle 36 as indicated at 114 while the planetary gears 108 also engage external teeth 116 formed about the periphery of a rotatable sleeve 118 surrounding the axle. Sleeve 118 is rotatably received in the housing on bearing 120. Splined to the periphery of sleeve 118 as indicated at 122 and carried by the sleeve is a ring gear 124 having internal teeth 126 mating with the drive gears of the respective hydraulic motors, three such gears being indicated at 128, 130 and 132.

Wedged between annulus 54 and front plate 60 is an annular porting disc or distributor valve plate 134 secured in position by spaced bolts such as that indicated at 136. Valve plate 134 is provided with a pair of annular cavities indicated at 138 and 140 which interconnect all the hydraulic motors with the hydraulic pump for the flow of liquid such as oil or the like through the hydraulic system. The cavities communicate by way of inlet and outlet ports 142 and 143 with the chambers of a rotating barrel 146 forming a portion of one of the swash plate motors or pump. The hydrostatic units are all of identical construction and the operation as a pump or motor is in a well known manner simply dependent upon the direction of flow of liquid through the unit. Slidably received in the barrel 146 are a plurality of pistons 148. Displacement of the pistons is controlled by a tiltable swash plate 150 having a stationary back-up plate 152 separated from rotatable thrust plate 154 by bearings 156. Barrel 146 is splined to a central shaft 158 as indicated at 160 which shaft is supported from a central partition 162 of the housing by means of bearings 164.

As best seen in FIGURE 2 electric motor 42 carries a driving pinion 170 on the end of its output drive shaft 172 which acts to drive a gear 174 of hydraulic pump 44 through an idler 176. Gear 174 of the pump also drives a smaller gear 178 mounted on the input shaft 180 best seen in FIGURE 3 of a double rotor oil pump 182. Hydraulic pump 44 is identical in construction to the motor shown in FIGURE 3 including a tiltable swash plate, sliding pistons and a central shaft. Gear 174 is secured to the end of the pump shaft 184 corresponding to the end 186 of shaft 158.

Hydraulic liquid driven by pump 44 passes through distributor valve plate 134 to each of the motors 46, 48, 50 and 52 to drive these motors and rotate their shafts, which shafts are engaged through gears such as 128, 130 and 132 of FIGURE 3 with the interior of ring gear 124. The last motor 52 drives by means of a suitable gear 190 also mounted on the end of its shaft corresponding to end 186 of shaft 158 the gear 192 mounted on the shaft 194 of a suitable centrifugal governor 196.

Each of the hydraulic motors as well as the hydraulic pump is supported by suitable outer brackets such as that indicated at 200 and inner brackets 202 mounted on an outer hub 204 and an inner hub 206 extending axially from central web 162 of the housing.

Figure 4:
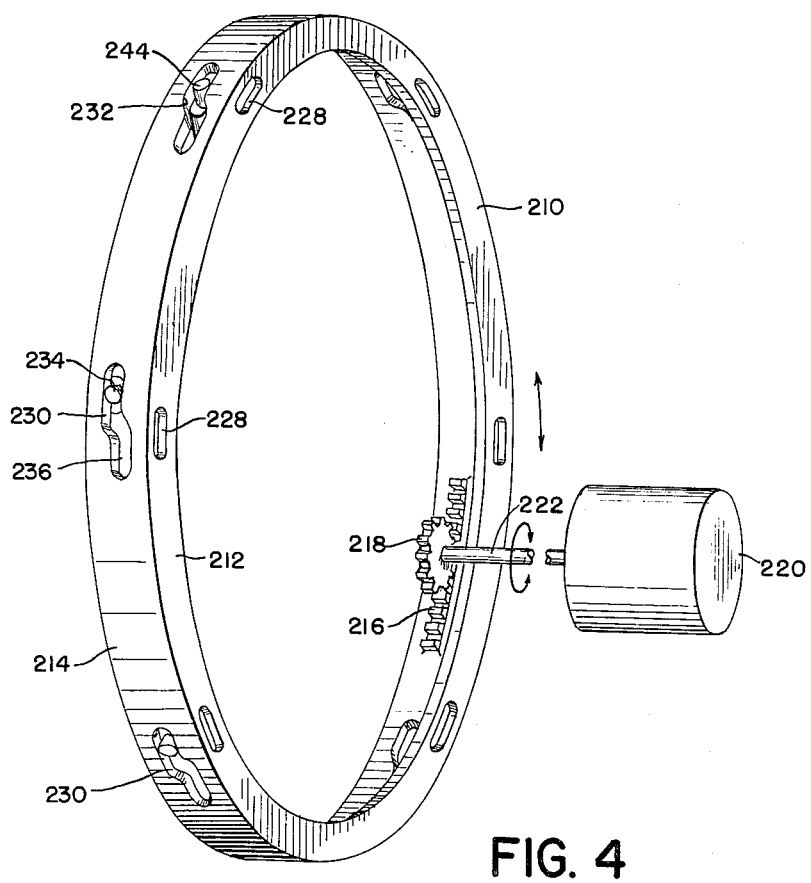
FIGURE 4 shows the cam plate actuating mechanism for the wheel of FIGURE 1.

An important feature of the present invention includes the provision of a swash plate cam ring 210 as best seen in FIGURE 4 of L-shaped cross section, the ring being rotatable to a certain limited extent within the inner surface of the housing and bearing against valve plate 134. Ring 210 includes a radial flange 212 and an axial flange 214 the interior of the latter being provided with teeth 216 over a small portion thereof which teeth engage with the driving pinion 218 of a rotary hydraulic actuator 220. Actuator 220 is of conventional construction and upon receipt of appropriate signals acts through shaft 222 to rotate pinion 218 through approximately 280 degrees. This rotation is imparted to the teeth 216 of the swash plate cam ring and acts to rotate the ring within the housing. The ring is secured by a plurality of bolts, two of which are indicated by dashed lines at 224 and 226 in FIGURE 3, which pass through valve plate 134 and through slots 228 in radial flange 212. The bolts are provided with turned over ends so that they are slidable within slots 228 but cannot be passed through the slots so as to release the ring from engagement with the valve plate.

Formed in the axial flange 214 are a plurality of cam slots 230 one being provided for each of the hydraulic motors and an additional one for the hydraulic pump. Cam slots 230 include a step portion 232 so as to define opposite ends 234 and 236 which are offset axially of the wheel.

Positioned alongside of each of the motors and the pump is an axially movable cam plate 240 guided in suitable slots formed in the hubs 204 and 206 of the central housing web 162. The cam plates are free to reciprocate back and forth axially of the wheel but are restricted against rotational movement. The outer end of each plate carries an arm 242 terminating in a radially extending pin 244 received in and guided by the slots 230. It is apparent that rotation of the swash plate cam ring 210 by the hydraulic actuator 220 serves to reciprocate the cam plates 240 adjacent each motor and pump by means of the camming action of the slots 230 bearing against the pins 244. Movement of the cam plates in turn acts to tilt the swash plates of each of the hydraulic units in a well known manner.

In operation an engine of a vheicle upon which the wheel is mounted drives an electrical alternator or generator. The output of the generator is coupled by suitable leads to the electric motor 42 mounted in the hub of the wheel. Motor 42 preferably takes the form of an electrical synchronous induction type of motor operating at a constant speed. The motor drives the hydraulic pump 44 at a constant speed and a constant torque. The hydraulic pump 44 circulates a hydraulic fluid through the distributor valve plate 134 to the four hydraulic motors in this way hydraulically driving the motors. The swash plates of all the motors and the pump are variable by means of rotation of the swash plate cam ring 210 to provide an infinitely variable gear ratio range. For example, the pump at its full displacement and one motor at one-half full displacement may give a certain ratio, for instance, 1 to 2, with the other three motors at zero displacement. At the other extreme, the pump at one-half full displacement with all four motors at full displacement may give a corresponding ratio of 8 to 1.

Since the constant speed electric motor does not know what is happening at the wheel it is possible to design the camming slots of the cam plates so that a constant load is placed on the electric motor regardless of whether the available horsepower is delivered at the wheel in the form of a high torque with low r.p.m. or high r.p.m. with low torque. In addition dynamic braking is possible through the system of the present invention by absorbing electrical current at the alternator.

The motors are driven by the pump so that the output gears such as gears 128, 130 and 132 engage ring gear 124. Rotation of the ring gear in turn rotates sleeve 118 against the action of planetary gears 108. These latter gears rotate the planetary carrier within ring gear 104 with the rotation of the planetary carrier acting to drive hub 32 through the spline connection at 114 of the planetary carrier to the axle and the additional spline connection at 34 of the drive axle to the hub. Rotation of the hub in turn carries wheel disc 18 and rim 12 to rotate a suitable tire or the like mounted on the rim.

In one embodiment of the present invention constructed to supply motivation power to logistic cargo carriers such as snow vehicles and other similar wheel type vehicles the wheel drive consisted of the structure shown wherein the electrical motor 44 took the form of an A.C. induction motor operating at a constant speed of 400 cycles per second. This A.C. motor in turn drove the pump at a constant speed. Porting in the distributor valve plate connected the pump and motors together for the flow of hydraulic fluid.

When the pump is at zero displacement there is no hydraulic flow. As the displacement position is increased flow into the four motors drives the wheel axle. As the pump is controlled to full displacement the motors drive the wheels at a faster speed. At full pump displacement further increase in speed occurs by reducing the displacement of one motor so that the flow through the three full displacement motors drives the axle faster. Additional axle speed is obtained by reducing displacement of the second motor until at maximum speed the total pump flow is through one motor which drives the axle. This final motor is indicated at 52 in FIGURE 2 and in turn drives governor 196. The displacement sequencing of the pump and motor is continuous giving infinitely variable transmission ratios and an ideal torque output.

While having a general utility for driving any type of wheel vehicle the drive unit of the present invention is particularly suited for heavier duty vehicles. Arrangements are provided by means of the present invention permitting pivotal movement of the wheel about frame members so that the wheel may turn in any desirable direction depending upon the movement of the vehicle desired. Turning of the vehicle may be accomplished through a variation in speed of different wheels of the vehicle so that the wheels on one side move faster than those on the other much in the manner of the well known track vehicles. Important features of the present invention included the novel mounting arrangement for the drive motor, the hydraulic pump and the hydrostatic fluid transmission motors all as a single incased unit on the axle of a wheel. Further important features include the novel arrangement for tilting the swash plates to obtain an infinitely variable transmission ratio for a plurality of circularly spaced hydraulic units wherein the hydraulic pump, the electric motor, and the fluid motors are all spaced about an axis common with the drive axis of a wheel.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle wheel comprising a drive axle, a hub and rim rotatably carried by said axle, a housing, said axle being journalled through the center of said housing, an electric motor, a hydrostatic pump and a plurality of hydrostatic motors all mounted within said housing at spaced points around said axle, said electric motor being mechanically coupled to drive said pump, said pump acting to hydraulically drive said motors, gear means coupling the outputs of said hydrostatic motors to said axle and means for varying the hydraulic fluid displacement relationship between said pump and said hydrostatic motors.

2. A wheel according to claim 1 including means for varying the displacement of said pump.

3. A wheel according to claim 1 including means for varying the displacement of one of said motors.

4. A wheel according to claim 1 wherein said displacement relationship varying means comprises a cam ring rotatable through a limited angle about the axis of rotation of said axle.

5. A vehicle wheel comprising a drive axle, a hub and rim rotatably carried by said axle, a housing, said axle being journalled through the center of said housing, an electric motor, a hydrostatic pump and a plurality of hydrostatic motors all mounted within said housing at spaced points around said axle, gear means drivingly connecting said electric motor to said pump, an annular distributor valve plate for connecting said hydrostatic units for the flow of fluid therebetween whereby said hydrostatic pump drives said hydrostatic motors through said valve plate, a planetary gear coupling the output from said hydrostatic motors to said axle, means on each of said hydrostatic units for varying its displacement, and cam ring within said housing having a cam slot for each of said hydrostatic units, means for rotating said cam ring through a limited angle about the axis of rotation of said axle, and means carried in said cam slots for actuating said displacement varying means upon rotation of said cam ring.

6. A wheel according to claim 5 wherein said hydraulic units are all of the swash plate type and said means carried in said cam slots comprises an arm coupled to said swash plates for varying the swash plate angle.

7. A wheel according to claim 6 wherein said hydrostatic motors each have an output shaft carrying a driving pinion, and a ring gear within said housing coupling each of said driving pinions to said planetary gear means.

8. A wheel according to claim 7 wherein said cam ring includes an annular flange extending parallel with the axis of rotation of said axle, said flange having gear teeth on its inner surface, and actuator means having a drive gear meshing with the teeth on said cam ring.

9. A wheel according to claim 8 wherein said housing includes means on opposite sides for pivotally connecting said wheel to a vehicle frame.

10. A wheel according to claim 9 wherein said electric motor is a synchronous constant speed induction motor.

References Cited in the file of this patent

UNITED STATES PATENTS

| 2,353,730 | Joy | July 18, 1944 |
| 2,390,240 | De Lancey | Dec. 4, 1945 |
| 2,430,528 | Moon | Nov. 11, 1947 |
| 2,432,107 | Williams | Dec. 9, 1947 |
| 2,441,801 | Dever | May 18, 1948 |
| 2,726,726 | LeTourneau | Dec. 13, 1955 |

OTHER REFERENCES

"Farm Mechanization," (Periodical), June 1952. Article: Hydraulic Propulsion by H. J. Hamblin, pages 229, 230.

"Automotive Industries," (Periodical), July 15, 1956, pages 53, 174.